Dec. 14, 1937.  R. C. BOUGHTON  2,101,894
PIPE JOINT
Filed Aug. 9, 1935
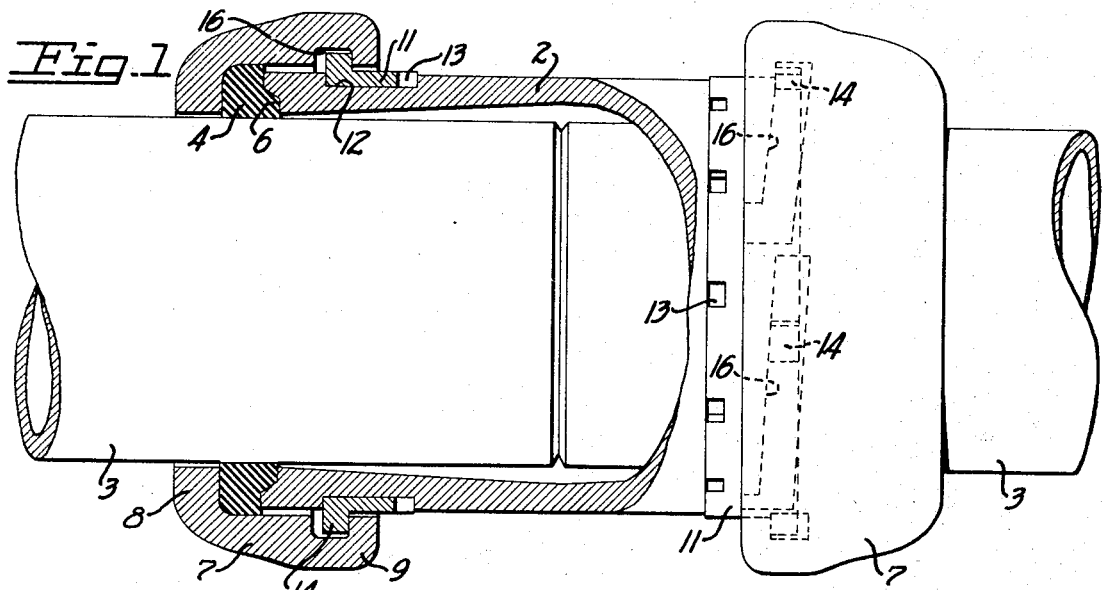
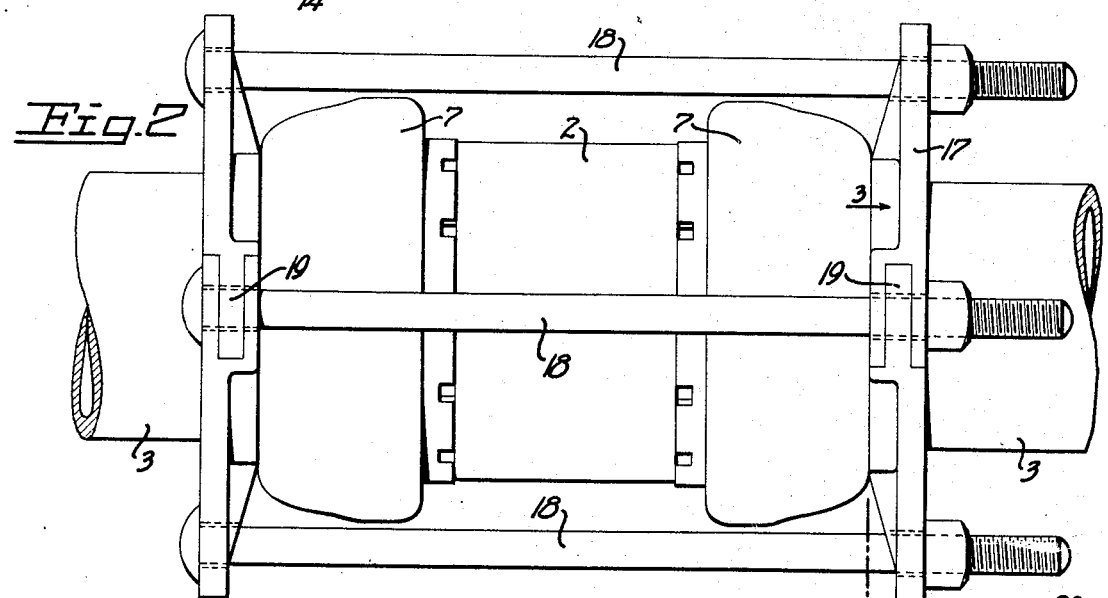
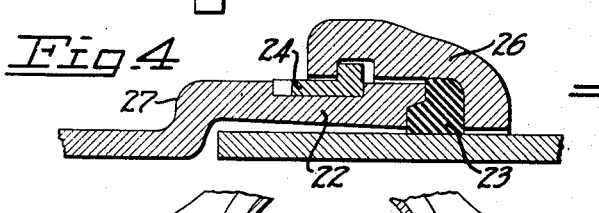
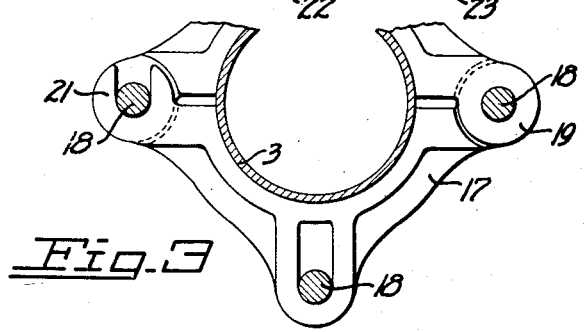
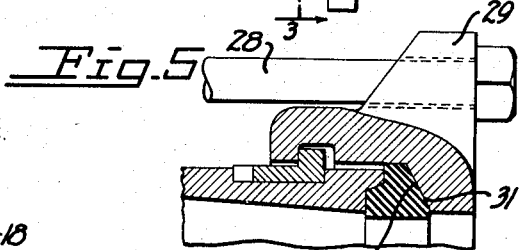
INVENTOR.
ROGER C. BOUGHTON.
BY Charles S. Evans
HIS ATTORNEY.

Patented Dec. 14, 1937

2,101,894

UNITED STATES PATENT OFFICE 2,101,894

PIPE JOINT

Roger C. Boughton, San Francisco, Calif.

Application August 9, 1935, Serial No. 35,446

8 Claims. (Cl. 285—196)

My invention relates to the joints in a pipe line, and more particularly to a structure for sealing such joints.

The broad object of my invention is to provide means for maintaining a sealing gasket under a permanent and unyielding pressure.

Another object of my invention is to provide improved means for locking the gasket between the pressure applying elements, and to eliminate clamping bolts.

A further object of my invention is to provide a pipe joint of the character described which is readily installed in a pipe line.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a side view, partly in section and partly in elevation, showing a pipe joint embodying the improvements of my invention.

Figure 2 is a side elevational view showing the joint with the auxiliary clamping mechanism in place; and Figure 3 is a fragmentary vertical sectional view of the same taken in a plane indicated by the line 3—3 of Figure 2, showing an end frame of the clamp.

Figure 4 is a detail sectional view showing a modified form of structure as applied to a bell and spigot joint;

Figure 5 is a similar view showing another variant form of construction.

In terms of broad inclusion, the pipe joint embodying my invention comprises a fixed element, a gasket, and a movable element for pressing the gasket against the fixed element. The fixed element may be in the nature of a sleeve embracing the ends of the pipes to be joined together; or it may be the bell of a bell and spigot joint. Auxiliary clamping means are provided for applying an initial pressure to the movable element for compressing the gasket between the elements; and means independent of the clamping mechanism and comprising a permanent part of the joint structure are provided for locking the elements together, whereby the pressure on the gasket is maintained after the auxiliary clamping mechanism is removed.

In greater detail, and referring particularly to Figure 1 of the drawing, the pipe joint embodying my invention preferably comprises a sleeve 2 for receiving the ends of pipe sections 3 to be coupled together. The inner surface of the sleeve 2 preferably tapers outwardly from the ends toward the center, so that greater clearance is provided at the central portions of the sleeve. This will accommodate a reasonable degree of misalignment in the pipes. A gasket 4 is positioned to encircle the pipe adjacent each end of the sleeve 2, and is arranged to seat against the end of the sleeve. The gasket is preferably provided with a tapered lip 6 engaging a complementary recess formed in the end of the sleeve. By this construction the gasket automatically centers the sleeve about the pipe; and the accurate centering permits a greater clearance to be maintained between the sleeve and pipe.

Means are provided for holding the gasket against the sleeve. This means preferably comprises a retaining ring 7 surrounding the pipe adjacent each end of the sleeve, with the gasket interposed between the ring and sleeve. The ring 7 is preferably cup-shaped to provide a vertical flange portion 8 for backing up the gasket, and a cylindrical flange portion 9 extending over the top of the gasket and embracing the end of the sleeve 2. The retaining ring therefore cooperates with the pipe and sleeve to substantially completely confine the gasket, so that when the ring is moved against the gasket the latter is forced against both the pipe and sleeve to seal the joint. Retaining ring 7 is preferably of cast iron, and is designed to withstand the high pressures under which the gasket is placed. The general shape and proportion of the ring, as shown in Figure 1, has been found satisfactory.

Means are provided for locking the retaining elements 7 to the fixed center element 2. This is accomplished by providing a locking ring 11 adjacent each end of the sleeve 2, so that a portion of the ring underlies the flange 9 of the retaining ring. These locking rings are turnably mounted on the sleeve in annular grooves 12, and the exposed portions of the ring are provided with a series of sockets 13 with which a spanner wrench or other suitable tool may be engaged to turn the locking ring. Preferably the locking rings are made of a corrosion resistant metal, such as stainless steel. It will also be noted that the locking rings are held by grooves 12 so that they comprise a structurally integral part of the sleeve. That is, the sleeve and the locking rings are one-piece. This reduces the number of separate parts, and simplifies the storing and handling of the parts.

Interlocking engagement between rings 7 and 11 is effected by a plurality of lugs 14 disposed circumferentially about the locking ring 11. These lugs, as better shown by the dotted lines in the right-hand portion of Figure 1, engage a series of inclined grooves 16 provided in the inner surface of the flange 9. These grooves open out on the inner side of the flange, which permits the retaining ring to be readily engaged with or disengaged from the locking lugs 14.

In the operation of this locking device the retaining ring 7 is slipped over the gasket and the end of the sleeve 2, so that the lugs 14 engage the openings of grooves 16. Subsequent turning of the locking ring 12 will then operate to turn the lugs into the inclined portion of the grooves 16; and, in order to facilitate the installation of the pipe joint, the parts are designed so that this initial locking movement may be done by hand. Once the lugs have been turned into the grooves 16, the retaining ring will stay in place, so that both hands of the operator are left free to apply the other gasket and retaining ring.

Means are provided for applying pressure to the retaining rings 7 to compress the gaskets 6. This means may be in the nature of an auxiliary clamping mechanism, and may be of any suitable construction, such as a hydraulic clamp, or a hand operated bolt frame. In Figures 2 and 3, I have shown a bolt frame comprising a pair of end frames 17 connected together by a plurality of bolts 18. The end frames are preferably split and the sections hinged together to permit the clamping mechanism to be inserted about the pipes. Preferably the frame sections are hinged by a tongue joint 19, pivoted on one of the bolts 18. This type of joint holds the end frame sections together. As shown in Figure 3, the sections are closed by a lap joint 21; one side of the lap encircling the bolt 18, and the other side having a cut-out to permit disengagement. In order to hold the bolts in alignment and add rigidity to the structure, the heads of the bolts are preferably welded to the end frame.

In applying the clamping mechanism, the end frames 17 are placed about the pipes against the retaining rings 7, as shown in Figure 2. The nuts on the bolts of the clamping mechanism are then tightened to draw the retaining rings toward the central sleeve 2 and compress the gaskets. As the nuts are tightened up, a suitable tool, such as a spanner wrench, is engaged with the sockets 13 of the locking ring 11, and the latter rotated to turn the lugs 14 into further engagement with the inclined grooves 16. For final tightening, it is preferred to drive the locking ring around with a punch and hammer. When the gaskets have been placed under sufficient pressure, and after the locking rings have been finally tightened up, the nuts of the clamping mechanism are released and the mechanism removed from the pipes. Since the threads on the bolts will strip after a certain amount of usage, the threaded ends of the bolts are preferably extended out a considerable distance, so that washers may be inserted and a new threaded portion used. This increases the life of the bolt frame, before the bolts have to be replaced.

The pipe joint as shown in Figure 1 represents the complete joint structure, in which the locking means is built into and comprises a permanent part of the structure. It will also have been noted that the particular locking means and its arrangement between the elements is an especially good design, from the point of view of the failure of the parts, to permanently resist the tremendous pressures under which the gaskets are placed.

In the ordinary type of coupling structure the gaskets are maintained under pressure by the provision of clamping bolts, which bolts are cinched up to compress the gaskets and then the whole structure including the bolts buried under ground. Experience has proven that this type of structure fails by reason of the fact that corrosion of the bolts reduces their cross sectional area to a point where they elongate and release the pressure on the gaskets. The result of course is a leaky joint. By eliminating the bolts, the joint of my invention is not subject to this weakness.

Figure 4 shows my improved joint structure as applied to pipes having bell and spigot joints. In this case, the bell 22 is flared inwardly, and the end of the bell is recessed to provide a seat for the lipped gasket 23. The bell is also provided with an annular groove for rotatably holding the locking ring 24. In this arrangement, a shorter bolt frame may be employed for applying the initial pressure to the gasket; one end frame of the clamping structure being positioned against the retaining ring 26, and the other end frame against the shoulder 27 of the bell. In this case, the bell 22 provides the fixed element against which the gasket seats; and a separate sleeve, such as the sleeve 2 of Figure 1, is not required. The retaining ring or movable element 26 functions the same as the movable element 7 of Figure 1; and the ring 24 for locking the elements together functions the same as the locking ring 11 of the structure first described.

A variant form of joint structure embodying my invention is shown in Figure 5. In this case the temporary clamping bolt 28, employed for applying the initial pressure to the retaining ring, is supported by lugs 29 formed integrally with the retaining ring. In other words, the end frames necessary in the construction shown in Figure 2 are eliminated. Preferably several lugs, say four, are provided on the retaining ring, so that four bolts may be applied for tightening up the gasket. In a joint, such as shown in Figure 1, such lugs would be provided on each of the retaining rings. In a bell and spigot joint, such as shown in Figure 4, the lugs would be provided on the retaining ring and on the opposing pipe adjacent the bell. After the pressure has been applied, and the elements locked together, the temporary clamping bolts 28 are removed.

Another variation in construction shown in Figure 5 is the provision of an inclined or bevelled face 31 on the retaining ring, adapted to bear against a complementary tapered back face of the gasket 32.

An important feature of my construction is that the locking ring is interposed between the elements being locked together; and, since it would take a tremendous load to shear the ring, there is no opportunity of developing a leaky joint due to failure of the parts. Another feature of great importance is the provision of the auxiliary or temporary clamping means for initially compressing the gasket. Since it is desirable to place the gasket under very large pressures, and since such pressures could not, except with great difficulty, be attained by merely turning the locking ring in its inclined grooves, because of frictional resistance, the provision of a temporary pressure applying means is highly desirable. By using a bolt frame for compressing the gasket, as shown in Figure 2, the locking ring may easily be turned into its final position; and this gives the desired result with simple devices and without great cost.

I claim:

1. A pipe joint comprising an annular element surrounding a pipe, a gasket seated against the element, a second non-rotatable annular element surrounding the pipe and bearing against the gasket, one of said elements overlapping the other, and a locking ring interposed between the lapping surfaces of the elements and turnably mounted on one of the elements and engageable with the other for locking the latter together.

2. A pipe joint comprising a sleeve embracing the end of a pipe, a gasket seated against the sleeve, a retaining ring bearing against the gasket and having a flange portion overlying the sleeve, said flange having an internal inclined groove therein, and a locking ring turnably mounted on the sleeve and engageable with said flange groove for locking the retaining ring to the sleeve.

3. A pipe joint comprising a sleeve embracing the end of a pipe and having an annular groove therein, a gasket seated against the sleeve, a ring bearing against the gasket and having a flange portion overlying the sleeve, said flange having an inclined groove therein, a locking ring turnably mounted on the sleeve and lying in said annular groove, and a lug on the locking ring for engaging the inclined groove of the retaining ring.

4. A pipe joint comprising a sleeve embracing the ends of pipes, a gasket seated against each end of the sleeve, a ring adjacent each end of the sleeve and bearing against the gaskets, and separate and independent means interengaging the sleeve adjacent each end thereof for locking the rings to the sleeve.

5. A pipe joint comprising a sleeve embracing the ends of pipes, a gasket seated against each end of the sleeve, a retaining ring adjacent each end of the sleeve and bearing against the gaskets, and separate and independent means adjacent each end of the sleeve for locking the rings to the sleeve, said locking rings being interposed between the retaining rings and said sleeve.

6. A pipe joint comprising a socket element for receiving the end of a pipe and having an annular groove formed in its outer peripheral surface, a gasket, a retaining ring for compressing the gasket against the end of the socket element, said ring overlying the end of the socket element and having an inclined groove formed in its inner peripheral surface, means for moving the ring axially against the gasket to compress the latter, and a locking ring rotatably disposed in the annular groove of the socket element and having a lug engaging the inclined groove of the retaining ring for locking the parts together after the gasket is compressed by said moving means.

7. A pipe joint comprising a sleeve for embracing the end of a pipe, a gasket, a retaining ring for compressing the gasket against the sleeve and having a flange portion overlying the sleeve, and a rotatable locking ring having a portion underlying the flange to provide interlocking means between the retaining ring and sleeve for locking the latter together and having a portion projecting out from under the flange to provide means adapted for engagement by a tool for turning the locking ring.

8. A pipe joint comprising a sleeve for embracing the end of a pipe and having an annular groove formed in its outer peripheral surface, a gasket, a retaining ring for compressing the gasket against the sleeve and having a flange portion overlying the sleeve, a rotatable locking ring in said groove having a portion underlying the flange and having a portion projecting out from under the flange to provide means adapted for engagement by a tool for turning the locking ring, and interlocking means on the retaining ring flange and said underlying portion of the locking ring.

ROGER C. BOUGHTON.